United States Patent
Gates et al.

(10) Patent No.: US 11,099,668 B2
(45) Date of Patent: *Aug. 24, 2021

(54) DEVICE THAT MANAGES POWER PROVIDED TO AN OBJECT SENSOR

(71) Applicant: Universal Electronics Inc., Santa Ana, CA (US)

(72) Inventors: Stephen Brian Gates, Mission Viejo, CA (US); Jeremy K. Black, N. Tustin, CA (US)

(73) Assignee: Universal Electronics Inc., Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/933,207

(22) Filed: Jul. 20, 2020

(65) Prior Publication Data

US 2020/0348768 A1  Nov. 5, 2020

Related U.S. Application Data

(63) Continuation of application No. 15/349,668, filed on Nov. 11, 2016, now Pat. No. 10,747,342, which is a
(Continued)

(51) Int. Cl.
*G06F 3/038* (2013.01)
*G06F 3/0354* (2013.01)
(Continued)

(52) U.S. Cl.
CPC ............ *G06F 3/0383* (2013.01); *G06F 1/32* (2013.01); *G06F 1/3259* (2013.01);
(Continued)

(58) Field of Classification Search
CPC .. G06F 3/0383; G06F 3/04886; G06F 3/0227; G06F 1/3259; G06F 3/03547;
(Continued)

(56) References Cited

U.S. PATENT DOCUMENTS

| | | |
|---|---|---|
| 5,659,335 A | 8/1997 | Partridge, III |
| 5,850,304 A | 12/1998 | Elmers et al. |

(Continued)

FOREIGN PATENT DOCUMENTS

| | | |
|---|---|---|
| DE | 9421469 U1 | 7/1995 |
| DE | 20006930 U1 | 9/2000 |
| JP | 2002-186070 | 6/2002 |

OTHER PUBLICATIONS

United States Patent and Trademark Office, Non-Final Office Action issued on U.S. Appl. No. 15/983,372, dated Jun. 20, 2018, 13 pgs.
(Continued)

*Primary Examiner* — Jonathan A Boyd
(74) *Attorney, Agent, or Firm* — Greenberg Traurig, LLP

(57) ABSTRACT

A hand-held device with a sensor for providing a signal indicative of a position of the hand-held device relative to an object surface enables power to the sensor at a first time interval when the hand-held device is indicated to be in a position that is stationary and adjacent relative to the object surface, enables power to the sensor at a second time interval shorter than the first time interval when the hand-held device is indicated to be in a position that is moving and adjacent relative to the object surface, and enables power to the sensor at a third time interval when the hand-held device is determined to be in a position that is removed relative to the object surface.

11 Claims, 6 Drawing Sheets

Related U.S. Application Data continuation of application No. 15/019,623, filed on Feb. 9, 2016, now Pat. No. 9,524,038, which is a continuation of application No. 14/616,044, filed on Feb. 6, 2015, now Pat. No. 9,285,867, which is a continuation of application No. 14/189,030, filed on Feb. 25, 2014, now Pat. No. 8,976,114, which is a continuation of application No. 13/097,212, filed on Apr. 29, 2011, now Pat. No. 8,717,295, which is a continuation of application No. 12/901,116, filed on Oct. 8, 2010, now Pat. No. 8,018,436, which is a continuation of application No. 12/783,679, filed on May 20, 2010, now Pat. No. 7,821,499, which is a continuation of application No. 11/657,345, filed on Jan. 24, 2007, now Pat. No. 7,746,324, which is a continuation of application No. 10/681,796, filed on Oct. 8, 2003, now Pat. No. 7,209,116.

(51) Int. Cl.
*G06F 1/32* (2019.01)
*G06F 1/3234* (2019.01)
*G06F 3/02* (2006.01)
*G06F 3/0488* (2013.01)

(52) U.S. Cl.
CPC ............ *G06F 3/0227* (2013.01); *G06F 3/038* (2013.01); *G06F 3/03543* (2013.01); *G06F 3/03547* (2013.01); *G06F 3/04886* (2013.01); *G08C 2201/63* (2013.01)

(58) Field of Classification Search
CPC ........ G06F 1/32; G06F 3/03543; G06F 3/038; G08C 2201/63
See application file for complete search history.

(56) References Cited

U.S. PATENT DOCUMENTS

| | | |
|---|---|---|
| 5,963,831 A | 10/1999 | Fu |
| 6,067,074 A | 5/2000 | Lueders |
| 6,137,479 A | 10/2000 | Olsen et al. |
| 6,271,831 B1 | 8/2001 | Escobosa et al. |
| 6,342,878 B1 | 1/2002 | Chevassus et al. |
| 6,417,840 B1 | 7/2002 | Daniels |
| 6,466,154 B1 | 10/2002 | Kim et al. |
| 6,509,911 B1 | 1/2003 | Shimotono |
| 6,525,306 B1 | 2/2003 | Bohn |
| 6,750,803 B2 | 6/2004 | Yates et al. |
| 6,794,992 B1 | 9/2004 | Rogers |
| 6,816,150 B2 | 11/2004 | Casebolt et al. |
| 6,882,334 B1 | 4/2005 | Meyer |
| 6,995,748 B2 | 2/2006 | Gordon et al. |
| 7,091,949 B2 | 8/2006 | Hansen |
| 7,333,785 B1 | 2/2008 | Lavelle et al. |
| 7,535,456 B2 | 5/2009 | Liberty et al. |
| 7,714,843 B1 | 5/2010 | Kong et al. |
| 2002/0196234 A1 | 12/2002 | Gray |
| 2003/0016417 A1 | 1/2003 | Lee |
| 2003/0028688 A1 | 2/2003 | Tiphane et al. |
| 2003/0107552 A1 | 6/2003 | Lu |
| 2003/0132912 A1 | 7/2003 | Hamana et al. |
| 2004/0041793 A1 | 3/2004 | Redding et al. |
| 2004/0095317 A1 | 5/2004 | Zhang et al. |
| 2004/0189609 A1 | 9/2004 | Estes et al. |

OTHER PUBLICATIONS

United States Patent and Trademark Office, Non-Final Office Action issued on U.S. Appl. No. 16/113,301, dated Sep. 26, 2018, 17 pgs.
United States Patent and Trademark Office, Final Office Action issued on U.S. Appl. No. 15/983,372, dated Jan. 4, 2019, 10 pgs.
Dennis Lui et al., USB Wireless Optical Mouse and Multimedia Keyboard Solution, Designer Reference Manual, Rev. 0, Jun. 2003, pp. 1-62.
Agilent ADNS-2030 Low Power Optical Mouse Sensor, Data Sheet, Agilent Technologies, Mar. 12, 2003, pp. 1-34.

DEVICE THAT MANAGES POWER PROVIDED TO AN OBJECT SENSOR

RELATED APPLICATIONS

This application claims the benefit of and is a continuation of U.S. application Ser. No. 15/349,668, filed on Nov. 11, 2016, which application claims the benefit of and is a continuation of U.S. application Ser. No. 15/019,623, filed on Feb. 9, 2016, which application claims the benefit of and is a continuation of U.S. application Ser. No. 14/616,044, filed on Feb. 6, 2015, which application claims the benefit of and is a continuation of U.S. application Ser. No. 14/189,030, filed on Feb. 25, 2014, which application claims the benefit of and is a continuation of U.S. application Ser. No. 13/097,212, filed on Apr. 29, 2011, which application claims the benefit of and is a continuation of U.S. application Ser. No. 12/901,116, filed on Oct. 8, 2010, which application claims the benefit of and is a continuation of U.S. application Ser. No. 12/783,679, filed on May 20, 2010, which application claims the benefit of and is a continuation of U.S. application Ser. No. 11/657,345, filed on Jan. 24, 2007, which application claims the benefit of and is a continuation of U.S. application Ser. No. 10/681,796, filed Oct. 8, 2003, which applications are hereby incorporated by reference in their entirety.

BACKGROUND

This invention relates generally to wireless devices and, more particularly, relates to a wireless device, such as a mouse having remote control capabilities by way of example, having a device managed input interface.

Wireless mice are well known in the art as a means for providing cursor manipulation and selection input to personal computers. However, as personal computer ("PC") functionality expands into home entertainment applications, such as exemplified by PCs using Microsoft's Windows Media Center Edition software, a need has also developed for the provision of remote control functionality in conjunction with personal computers. FIG. 1 illustrates such a Media Center Edition PC product 100 (prior art) which is supplied with both a mouse 102 and a remote control 104. Although not illustrated in FIG. 1, it is anticipated that such PCs will be interfaced to home entertainment appliances such as televisions, satellite set top boxes, etc., to eventually become an integral part of an overall home entertainment system. In such cases universal remote control functionality, i.e. the ability to control multiple consumer entertainment appliances of different types and different manufactures, will also be a desirable feature in a remote control supplied with such a PC.

As a result of this convergence of PC and home entertainment equipment a need thus exists for a hand-held user input device which combines the control functionalities required for both PCs and home entertainment appliances. Unfortunately, the requirements for each of these classes of device are different. Control of a PC is best effected via a "mouse" used to manipulate a cursor and make selections. Mouse-generated x-y positioning input is, however, not easily adapted to operation of conventional entertainment equipment, for which a button-oriented remote control is better suited. Furthermore, many wireless mice operate using RF transmission to avoid line-of-sight issues when operated from a cluttered surface, in contrast to most entertainment equipment remote controls which are intended to be picked up and pointed at the controlled apparatus, and thus generally use IR as a transmission medium.

Accordingly, a need exists for an improved device having integrated mouse and remote control capabilities which thus combines the control functionalities required for both PCs and home entertainment appliances.

SUMMARY

A hand-held device having a device managed input interface is described. To manage the input interface of the device, the device generally obtains from a sensor associated with the device a value representative of a position of the held device relative to an object surface. The invention then uses the value obtained from the sensor to cause the hand-held device to automatically transition from a first state in which the input interface is enabled to a second state in which at least a portion of the input interface is inhibited.

A hand-held device that manages power provided to a sensor that generates a signal indicative of a position of the hand-held device relative to an object surface is also described. The hand-held device enables power to the sensor at a first time interval when the hand-held device is indicated to be in a position that is stationary and adjacent relative to the object surface, enables power to the sensor at a second time interval shorter than the first time interval when the hand-held device is indicated to be in a position that is moving and adjacent relative to the object surface, and enables power to the sensor at a third time interval when the hand-held device is determined to be in a position that is removed relative to the object surface.

While described in the context of an integrated mouse and remote control, the hand-held device is not to be so limited. Rather, it will be appreciated that the concepts described hereinafter may be applicable to any type of device.

A better understanding of the objects, advantages, features, properties and relationships of the subject controlling device will be obtained from the following detailed description and accompanying drawings which set forth an illustrative embodiment which is indicative of the various ways in which the principles thereof may be employed.

BRIEF DESCRIPTION OF THE DRAWINGS

A controlling device having integrated mouse and remote control capabilities is hereinafter described with reference to examples shown in the following drawings in which.

DETAILED DESCRIPTION

Figure 1:
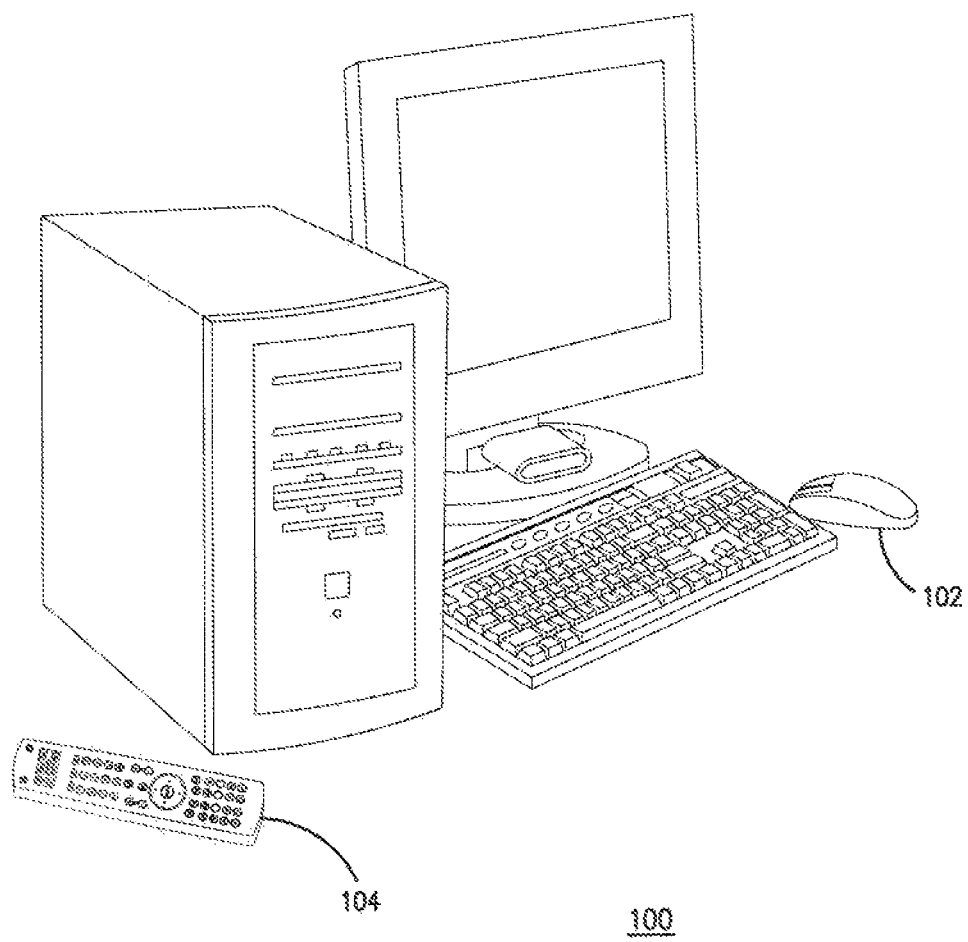
FIG. 1 illustrates an example prior art system.

Referring now to the figures, wherein like reference numerals refer to like elements, there is illustrated a control device 200 having integrated mouse and remote control capabilities. As will be appreciated from the following description, the control device 200 is generally configured to be used easily for traditional mouse-like operation, while remote control functionality is effected by one or more of various buttons, toggles, switches, touch panels, and the like configured on the control device. Additionally, one or more buttons on the control device may be adapted for use in both mouse and remote control device modes. In order to detect changes in device mode (for operation as a mouse or operation as a remote control) and also to effect mouse based operations, the control device includes an optical sensor, typically on the underside of control device 200.

The construction and operation of optical mice, i.e., those which sense movement by analyzing minute variations in the surface upon which they are resting, is well understood in the art. For example, "ADNS-2030 Low Power Optical Mouse Sensor Data Sheet," document 5988-8421EN, Mar. 12, 2003, published by Agilent Technologies Inc., describes the electrical and mechanical requirements and operation of such an optical motion sensor while "USB Wireless Optical Mouse and Multimedia Keyboard Solution: Designer Reference Manual," document DRM042/D Rev 0, June 2003, published by Motorola Inc., describes the design of a complete wireless mouse system using the above referenced Agilent optical sensor. For the sake of brevity, only those details regarding construction and operation of the underlying optical mouse system which are necessary to fully elucidate the current invention will be described herein. A reader desirous of additional background information may refer to the above referenced documents which are incorporated herein by reference in their entirety.

Figure 2:
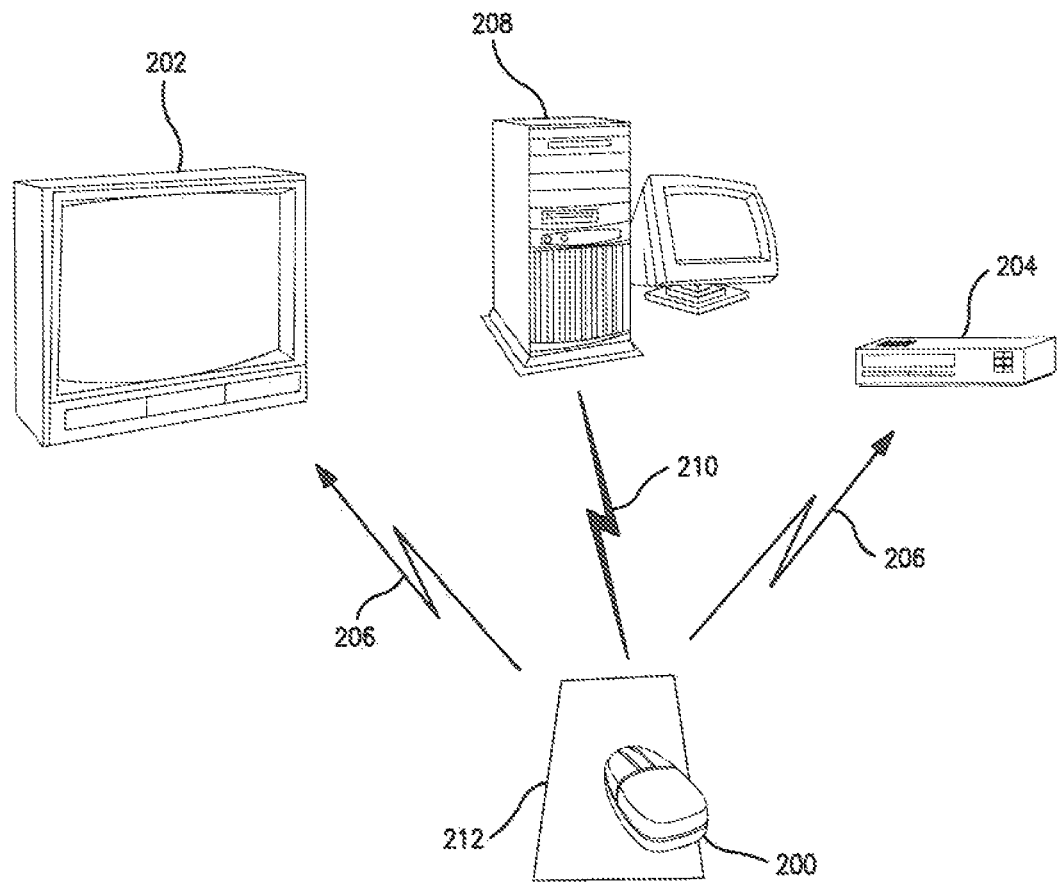
FIG. 2 illustrates an exemplary control environment including an exemplary controlling device having integrated mouse and remote control capabilities.

With reference now to FIG. 2, a control device 200 is illustrated as capable of commanding operation of a television 202 and a set top box 204 via wireless (e.g., IR) transmissions 206 while also able to be used as a mouse communicating with a PC 208 via wireless (e.g., RF) transmissions 210. While the exemplary control device 200 is shown and described as using IR transmissions for remote control functionality and RF transmissions for mouse functionality, it will be understood by those skilled in the art that both wireless mice and remote controls are easily configured for operation using either IR and/or RF transmissions. Accordingly, the subject control device contemplates the use of IR and/or RF transmissions to effectuate communications. Still further, it is contemplated that the described controlling device may be modified to provide a single device that allows either or both mouse and remote control commands to be transmitted via wired connections to the appropriate devices to be controlled.

Figure 3:
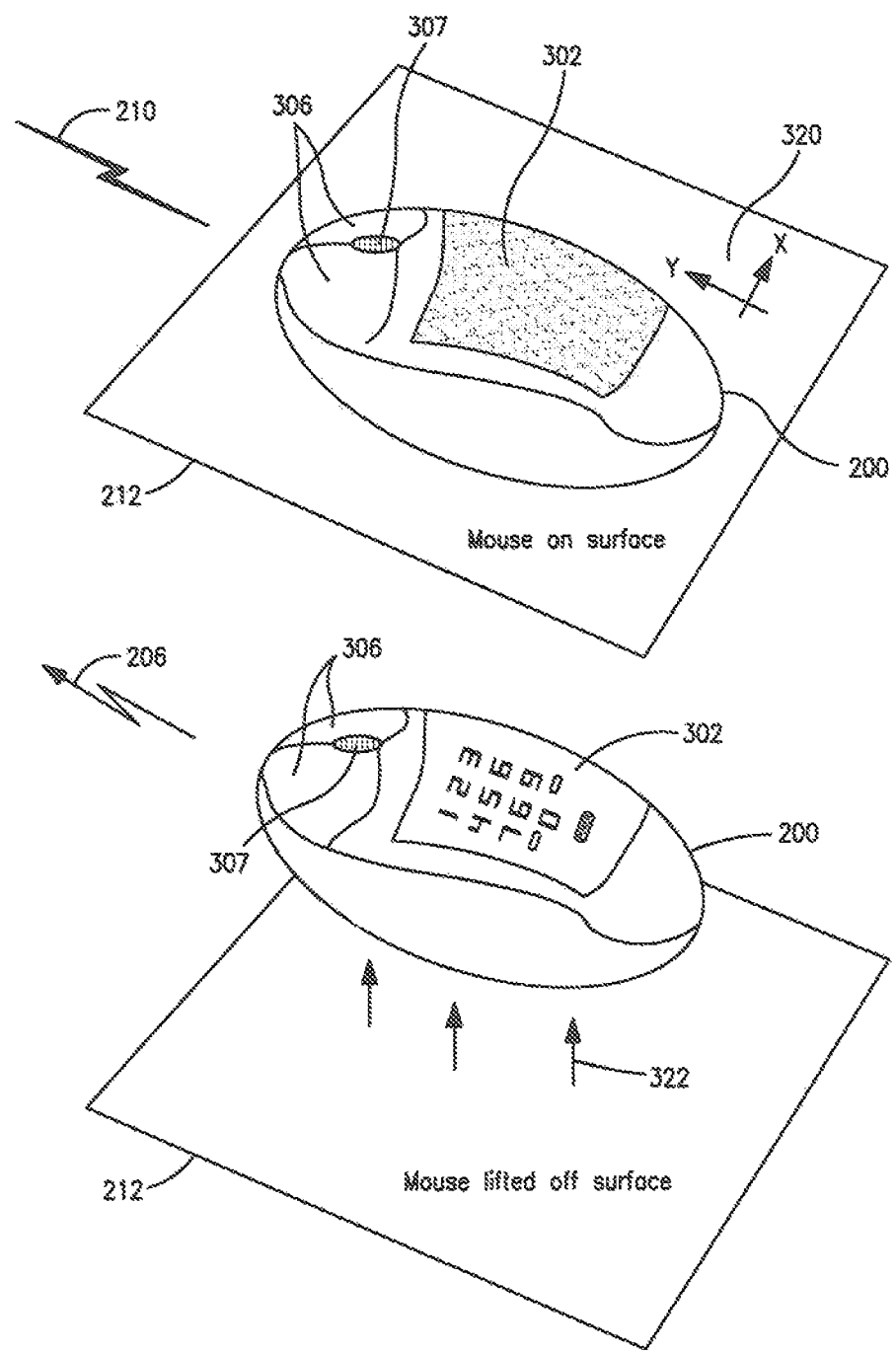
FIG. 3 illustrates the various control and transmission modes of the exemplary control device of FIG. 2.

Turning now to FIG. 3, when the exemplary control device 200 is resting on a surface 212 such as a mouse pad, tabletop, users leg, etc., it functions as a mouse transmitting data 210 (e.g., representative of x-y movements 320 of the controlling device 200, scroll wheel 307 activity, and left/right button 306 clicks) to the associated PC 208. However, employing methods that will be described in further detail hereafter, the functionality of the exemplary control device 100 may automatically switch from that associated with a mouse to that associated with a remote control when the exemplary control device 200 senses that it has been lifted 322 off the surface 212. In this case, activation of the scroll wheel 307, buttons 306, etc. results in the transmission of data 206 (e.g., to command appliance functions such as TV volume, mute and power, etc.) to one or more of the associated entertainment appliances 202, 204. Furthermore, the upper case of the control device 200 may also incorporate additional remote control specific buttons (e.g., number keys, macro keys, mode keys, etc. as described in commonly assigned U.S. Pat. No. 4,959,810 which is incorporated herein by reference in its entirety) and/or a display (e.g., a segmented EL display panel and associated touch sensitive overlay 302 of the general type described in commonly assigned, co-pending U.S. patent application Ser. No. 10/410,103 entitled "Remote Control with Local, Screen Guided, Setup" which is hereby incorporated by reference in its entirety). When operating in the mouse mode, the remote control specific buttons and/or EL panel 302, if any, are preferably not energized and, as such, the panel 302 would remain dark as illustrated in FIG. 3. When operating in the remote control mode, however, the buttons and/or EL display panel and associated touch sensitive surface 302 may be activated to provide additional remote control key functionality as described in the above referenced '103 application. While the display 302 having touch screen control keys is illustrated as being provided to an outer surface of the controlling device 200, it will be appreciated that a display 302 and/or further remote control buttons may be disposed behind a panel that is hingedly attached, for example, to the outer surface of the controlling device 200.

Figure 4:
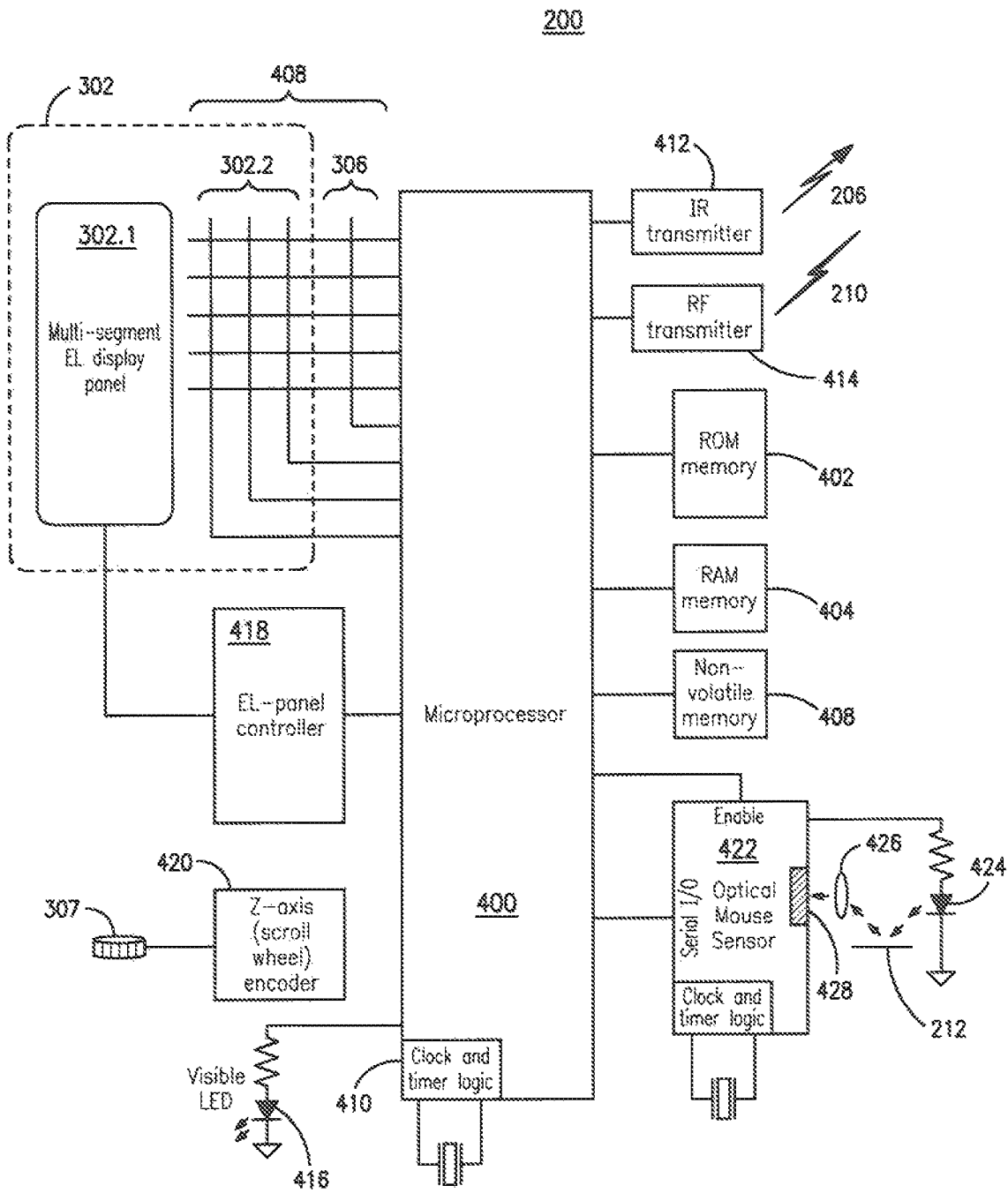
FIG. 4 illustrates a block diagram view of various components of the exemplary control device of FIG. 2.

Referring now to FIG. 4, there is illustrated in bock diagram form the hardware architecture of an exemplary control device 200. This hardware architecture may include, as needed for a particular application, a processor 400 coupled to one or more memory devices (such as a ROM memory 402, a RAM memory 404, and a non-volatile memory 406), a key matrix 408 (e.g., physical buttons 306, a touch sensitive panel 302.2, or a combination thereof), an internal clock and timer 410, transmission circuits (e.g., IR 412 and/or RF 414), a means to provide visual feedback to the consumer (e.g., LED 416 and/or EL panel controller 418 and associated EL display 302.1, or the like), means to provide audio feedback to the user (e.g., a speaker—not illustrated), and a power supply (not illustrated). Also coupled to processor 400 may be a scroll wheel encoder 420 which may be of the optical or mechanical type, both well known in the art, and an optical mouse sensor subsystem 422. While the optical mouse sensor 422 may be strictly regarded as a microcontroller in its own right, since a typical sensor such as the exemplary Agilent ADNS-2030 includes a digital signal processor ("DSP"), memory, and self-contained programming with which to process the incoming image frames, for clarity in this description it will be treated simply as a component module of the system. When enabled by the processor 400, the optical mouse sensor subsystem 422 illuminates the surface 212 on which the mouse is resting via LED 424, capturing sequential images of surface features (frames) via lens 426 and light sensor 428 and performing a mathematical analysis of the differences between successive frames in order to determine direction and magnitude of movement, which is reported back to processor 400 for onward transmission to PC 208 via RF transmitter 414. As will become apparent hereafter, information reported back by the optical mouse sensor 422 may also be useful in determining whether mouse 200 is in contact with surface 212 or has been lifted away.

As will be understood by those of skill in the art, the memory device(s) 402, 404 and/or 406 include executable instructions that are intended to be executed by the processor 400 to control the operation of the control device 200. In this manner, the processor 400 may be programmed to control the various electronic components within the control device 200, e.g., to monitor and manage the power supply to the components, to decode key presses and cause the transmission of command signals to entertainment appliances, to read and transmit mouse and scroll wheel positioning information to a PC, to operate user feedback means such as LEDs and/or displays, etc. In addition, the non-volatile memory 406, for example, an EEPROM or the like, may store setup data and parameters as necessary such that data is not required to be reloaded after battery changes. It is to be additionally understood that the memory devices may take the form of any type of readable media, such as, for example, a Smart Card, memory stick, a chip, a hard disk, a magnetic disk, and/or an optical disk. Still further, it will be appreciated that some or all of the illustrated memory devices may be physically incorporated within the same IC chip as the microprocessor 400 (a so called "microcontroller") and, as such, they are shown separately in FIG. 4 only for the sake of clarity.

To cause the control device 200 to perform an action, the control device 200 is adapted to be responsive to events, such as a sensed consumer interaction with the key matrix 408, scroll wheel 307, etc., or detection of mouse movement by optical mouse sensor 422. In this connection, optical mouse sensor 422 is enabled on a periodic basis as further described below in conjunction with FIG. 5. In response to an event, appropriate instructions and/or data within the memory devices are executed and/or accessed. For example, when a command key is activated on the control device 200 while it is operating in the remote control mode (i.e., in a position lifted away from surface 212), the control device 200 may retrieve a code data value corresponding to the activated command key from a memory device and access instructions to transmit the retrieved code data value to a device in a format recognizable by the device. It will be appreciated that the instructions within the memory devices can be used not only to cause the transmission of command codes and/or data to the devices but also to perform local operations. While not limiting, local operations that may be performed by control device 200 when in the universal remote control mode include setting up the remote control to operate specific items of equipment (e.g., a "Sony" brand TV set or a "Philips" brand set top box), favorite channel setup, macro button setup, etc. Since examples of set up and local operations can be found in U.S. Pat. No. 4,959,810 "Universal Remote Control Device," U.S. Pat. No. 5,255,313 "Universal Remote Control System," U.S. Pat. No. 5,481,256 "Favorite Key Command and Chained Macro Command in a Remote Control," and U.S. Pat. No. 6,587,067 "Universal remote control with macro command capabilities" all of which are incorporated herein by reference in their entirety, this will not be discussed in greater detail herein, except to point out that one such local operation may specifically be provided to allow the user of the mouse/universal remote control combination to designate which particular remote control functions are to be made available on the mouse hard buttons and scroll wheel, for example, selecting between configurations such as volume up/down or channel up/down on scroll wheel, mute, power or previous channel on a hard button, etc. Furthermore, in this exemplary remote control 200, the EL panel 302.1 may be constructed as described in pending PCT patent application WO 00/72638, which is assigned to Cambridge Consultants Ltd. and which is incorporated herein by reference in its entirety, to allow various parts of the display to be independently illuminated under control of the microprocessor 400 and EL display controller interface 418. The advantage of such a construction is that different elements may be illuminated at different times, for example depending on the activity currently being performed by the user.

When operating in the mouse mode (e.g., while in sensed contact with surface 212) the control device 200 may disable the EL display 302.1 and associated portion 302.2 of key matrix 408, while continuing to monitor only the portion 306 of the key matrix associated with the mouse buttons, as well as the input from the scroll wheel encoder 420 and the periodically-enabled optical mouse sensor 422. It will be appreciated that in cases where the scroll wheel mechanism is of the optically encoded type, as a power conservation measure it may also be periodically enabled in conjunction with or separately from the optical mouse sensor. Further, when operating in the mouse mode, various power management strategies may be practiced by the programming of processor 400 with regard to the periodic activation of the optical mouse sensor subsystem, as will be described in greater detail hereafter in conjunction with FIG. 5.

It should also be noted that while the embodiment illustrated incorporates both the wireless mouse and universal remote control transmission management functions into a single microcontroller 400, other implementations using separate microcontrollers for each operational mode are also possible.

Figure 5:
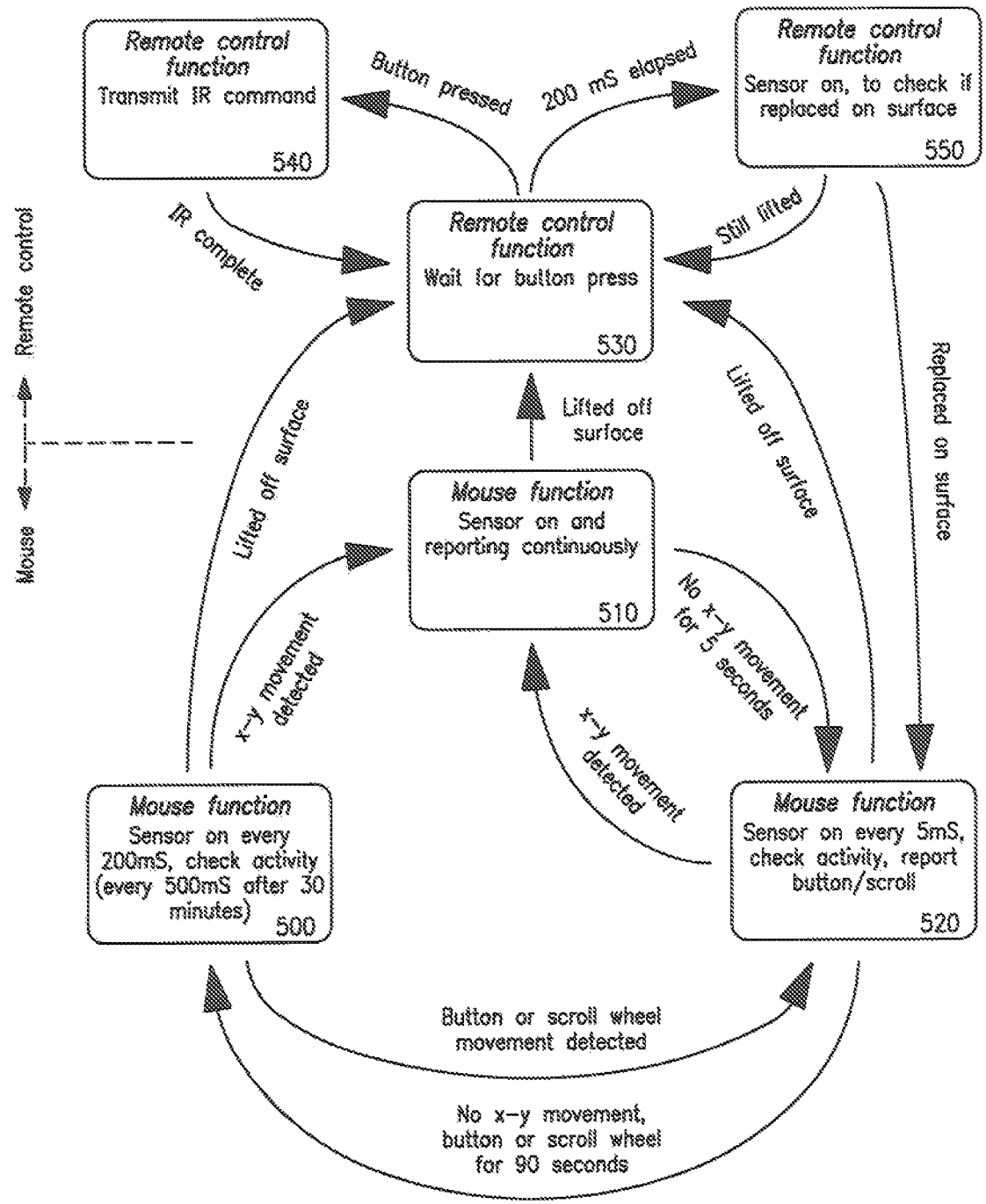
FIG. 5 illustrates an exemplary method for detecting and reconfiguring the exemplary control device of FIG. 2 for mouse or remote control functionality.

Turning now to FIG. 5, there is illustrated in further detail the incorporation of a test for lift up and the automatic switching back and forth between remote control functionality and mouse functionality into an exemplary power management sequencing algorithm for a wireless mouse as can be found in the before mentioned Motorola Designer Reference Manual. In this regard, many microcontrollers designed for embedded applications, such as for example some members of the Motorola 68HC08 or Microchip PIC families, include an ability to operate in a low power quiescent mode wherein all operations are suspended except for a single timer which functions to reawaken the main processor after a predetermined period. In this manner, a battery powered device such as a wireless mouse may conserve battery life by shutting itself down during periods of inactivity, while still accommodating the requirement to reawaken at intervals to briefly check for resumption of activity.

When stationary and resting on surface 212, the control device is normally in state 500. In this state, processor 400 spends most of its time in a quiescent mode as described above, waking at relatively long intervals and briefly enabling power to the optical mouse sensor 422 (and scroll wheel encoder 420 if required) in order to check for any activity. As is well known in the art, internal circuitry within the processor may also immediately generate a wakeup condition in response to key matrix activity, e.g., a mouse button 306 (scroll wheel implementations and/or lift-up detectors using mechanical contacts, tilt switch, etc. may also be supported via this method.) If the control device 200 detects that it has been lifted off the surface 212, it automatically switches to remote control functionality, entering state 530. If, on the other hand, the control device 200 detects mouse activity, it enters either state 510 or 520 depending on the type, x-y motion or button press. In state 510, entered into upon detection of x-y movement, the optical mouse sensor is interrogated continuously and any motion reported to the PC. In state 520, entered into as a result of button press or scroll wheel activity, the sensor is interrogated intermittently, but on a more frequent basis than in state 500, on the presumption that button or scroll activity may be a precursor to x-y motion. If mouse use continues, the control device 200 may transition back and forth between states 510 and 520 as appropriate. If no activity is detected for a relatively long period of time, the control device will return to idle state 500. If at any time the control device 200 detects it has been lifted off surface 212, it automatically transitions to the remote control operational state 530. On entering into state 530, the control device 200 may illuminate the EL panel (if so equipped), enable buttons or touch panel keys 302.2 (it being understood that during mouse mode operation, only the mouse button portion 306 of the overall key matrix 408 may have been enabled), and enter into a low-power state waiting for a key press. Whenever a key is pressed (it being understood that in this context the term "key press" includes scroll wheel activity—e.g., the scroll wheel may be tied to volume control functionality) the control device transmits 540 the appropriate remote appliance control command and returns to state 530. Additionally, using the same timer mechanisms as described earlier, the control device 200 may periodically awaken and briefly transition to state 550 wherein the optical mouse sensor 422 is enabled in order to verify that the control device 200 is still lifted off surface 212. If it is determined that the control device 200 has been returned to the surface 212, it may automatically return to mouse functionality at state 520. State 550 may also incorporate an additional timing test (not illustrated) to shut down EL panel illumination after a certain amount of time has elapsed with no button activity.

By way of further example, a test for lift up may be performed as follows: The before mentioned Agilent ADNS-2030 may be used as the optical mouse sensor 422. The ADNS-2030 provides a readable parameter SQUAL ("Surface QUALity") which is a measure of the number of distinct features visible to sensor 428 in the current field of view. SQUAL is reported in the form of a one-byte number between 0 and 255, and is equal or close to zero if there is no surface below the sensor within the focal plane of lens 426. In general, the focal depth of the optical systems used in mouse applications is of the order of a few millimeters, so it will be appreciated that whenever the mouse is lifted off the surface 212 on which it rests, the reported SQUAL value will rapidly reduce to near zero. By testing the SQUAL value on a regular basis, the microcontroller 400 programming is thus able to determine if the control device 200 has been picked up from and/or replaced onto surface 212, and switch back and forth between remote control and mouse functionality accordingly.

It will be appreciated that the above described method is not intended to be limiting. Many other detection methods are possible. For example, other brands or models of optical mouse sensor may use different techniques for detecting and/or reporting the absence of a surface below the mouse, or may not report it at all. In this latter case, alternative sensing means such as user activated buttons or switches, tilt based switches, mechanical contacts on the underside of the mouse body, gyroscopic sensors, etc., may be provided as a substitute sensing mechanism. Such alternative sensing mechanisms may in some cases (e.g., gyroscopic motion and direction based sensors) also be configured to provide the mouse and/or additional remote control capabilities. These alternative approaches may also be appropriate for mouse sensor implementations using electromechanical motion sensing methods and thus lacking inherent "lift up" detection ability.

Figure 6A:
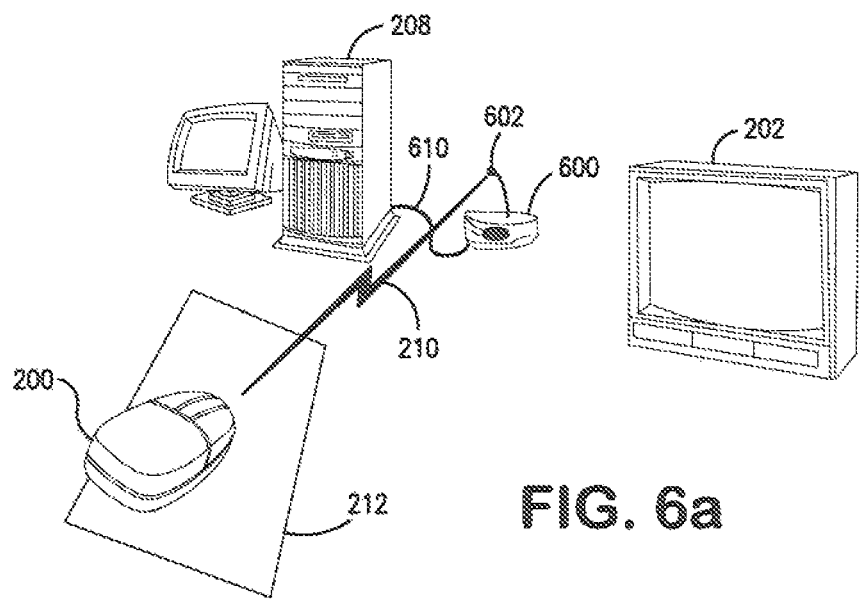
FIGS. 6a and 6b illustrates an alternative embodiment of a control device having integrated mouse and remote control capabilities.
Figure 6B:
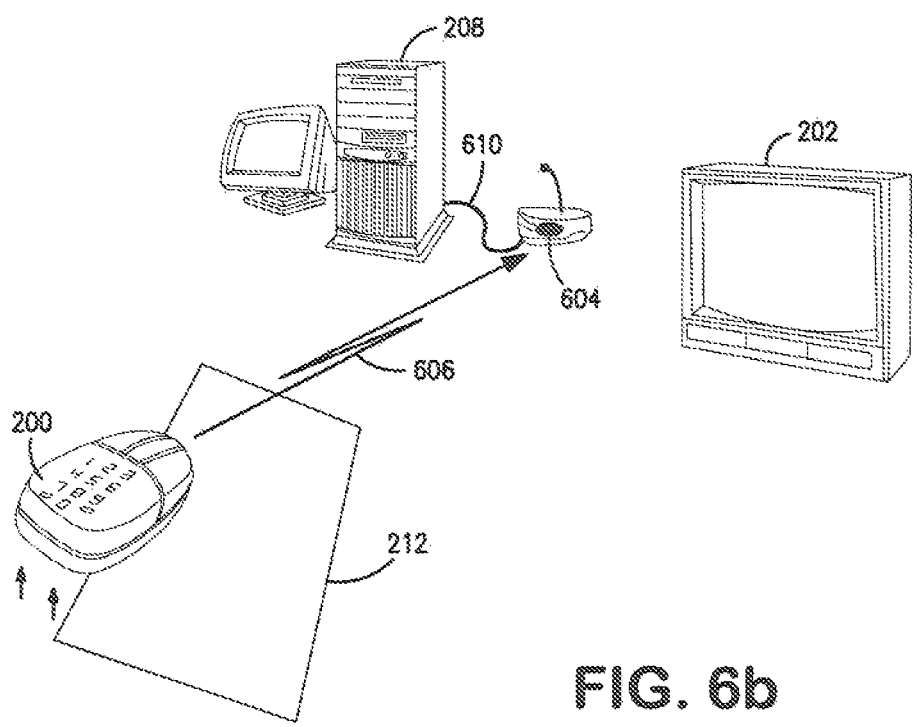

FIG. 6 illustrates an further embodiment of a control device 200, wherein the control device 200 operates in a manner similar to that described above except that it additionally includes an IR wireless pointer subsystem constructed in accordance with the teachings of U.S. Pat. No. 5,963,145 "System for Providing Wireless Pointer Control" and U.S. Pat. No. 6,271,831 "Wireless Control and Pointer System," both of like assignee and both incorporated herein by reference in their entirety. In general, these subsystems provide for user control of for example, a cursor, via the motion of a hand held pointing device transmitting an IR beacon signal 606, which signal is received and analyzed by a base station 600, 604 and used to determine orientation and movement of the control device 200 relative to the base station. For the sake of brevity herein, the interested reader is referred to the above referenced U.S. patents for more complete details regarding the systems and methods by which this is accomplished. In the instant embodiment, when the control device 200 is resting on surface 212 as illustrated in FIG. 6*a*, it operates as a mouse device in the manner previously described, communicating mouse data to PC 208 via, for example, RF transmissions 210. In this case, the receiver 600, 602 for RF signals 210 is integral with the base station used to receive the IR beacon signals mentioned above, and shares a common interface 610 to PC 208. When the control device 200 is lifted from surface 212, as illustrated in FIG. 6*b*, it automatically switches to remote control functionality in the manner previously described. However in this embodiment, immediately prior to switching into remote control mode the mouse/universal remote control combination transmits a final RF notification to base unit 600, which causes the base unit to activate its beacon receiver 604 and enable transfer of beacon-derived movement data to the PC via interface 610. As will be appreciated by those of skill in the art, this beacon-derived movement data may be normalized by the internal logic of the base unit such that the switch from optical mouse sensor data to IR beacon-derived data is transparent to the PC mouse decoding software, resulting in a seamless transition from one method to the other. Similarly, when the control device is replaced on surface 212, a transmission may be initiated to return the base unit 600 to mouse operation. While in the remote control mode, the user of such a device may thus be provided with a button which serves to activate the cursor control beacon, making is possible to continue to manipulate the cursor on the PC screen while also controlling an entertainment appliance(s) 202. While specifically described in terms of the technology disclosed in the above referenced U.S. Pat. Nos. 5,963,145 and 6,271,831, it will be appreciated that other free space gesture and/or pointing data generation means may also be used in a similar manner, for example accelerometers, tilt switches, etc.

While various embodiments of a system and method for constructing a control device having integrated mouse and remote control functionality have been described in detail, it will be appreciated by those skilled in the art that various modifications and alternatives to those details could be developed in light of the overall teachings of the disclosure. Additionally, while described in the context of functional modules and illustrated using block diagram format, it is to be understood that, unless otherwise stated to the contrary, one or more of the described functions and/or features may be integrated in a single physical device and/or a software module in a software product, or one or more functions and/or features may be implemented in separate physical devices or software modules.

It will also be appreciated that a detailed discussion of the actual implementation of each module is not necessary for an enabling understanding of the invention. Rather, the actual implementation of such modules would be well within the routine skill of a programmer and system engineer, given the disclosure herein of the system attributes, functionality, and inter-relationship of the various functional modules in the system. For example, in applications which require only simple or no universal remote control functionality, the touch sensitive EL panel-based keypad portion may be omitted and basic remote control functionality supplied only by way of physical buttons and the scroll wheel (if provided for standard mouse operation); transmission of mouse data to a PC may utilize methods other than RF, e.g. IR or a hard-wired connection such as USB, serial RS232, or PS2; transmission of commands to consumer appliances may utilize methods other than IR, e.g. direct RF, wireless networking such as IEEE 802.11 or Bluetooth, acoustic; etc. Furthermore, the consumer appliances controlled may not be limited to entertainment devices but may also include thermostats, lighting, drapes, domestic appliances, alarms, irrigation systems, and the like, as well as communication systems, home gateways, and other computing and home automation devices which may become part of or associated with the user's overall media center home configuration. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All documents cited within this application for patent are hereby incorporated by reference in their entirety.

What is claimed is:

1. A hand-held device, comprising:
a processing device;
a sensor coupled to the processing device;
a plurality of input receiving elements coupled to the processing device;
a first transmission device coupled to the processing device;
a second transmission device coupled to the processing device; and
a memory coupled to the processing device, the memory having stored thereon instructions wherein, when executed by the processing device, cause the hand-held device, to perform steps comprising: using signals received from the sensor to determine when the hand-held portable device is positioned proximate to an object surface and to determine when the hand-held portable device is removed from the object surface; and causing the hand-held device to automatically transition from a first operational mode to a second operational mode when it is determined from a signal received from the sensor that the hand-held portable device has been moved proximate to the object surface and to automatically transition from the second operational mode back to the first operational mode when it is determined from a signal received from the sensor that the hand-held portable device has been subsequently moved away from the object surface; wherein, in the first operational mode, the hand-held device is configured to use the first transmission device when transmitting one or more communications in response to an activation of one or more of the plurality of input receiving elements and, in the second operational mode, the hand-held device is configured to use the second transmission device when transmitting one or more communications in response to an activation of one or more of the plurality of input receiving elements and wherein the first transmission device is different from the second transmission device.

2. The hand-held device as recited in claim 1, wherein the first transmission device comprises a radio frequency transmission device and wherein the second transmission device comprises an infrared transmission device.

3. The hand-held device as recited in claim 1, wherein, in the first operational mode, the hand-held device is configured to use a first command code set when transmitting one or more communications in response to an activation of one or more of the plurality of input receiving elements and, in the second operational mode, the hand-held device is configured to use a second command code set when transmitting one or more communications in response to an activation of one or more of the plurality of input receiving elements and wherein the first command code set is different than the second command code set.

4. The hand-held device as recited in claim 3, wherein the first transmission device comprises a radio frequency transmission device and wherein the second transmission device comprises an infrared transmission device.

5. The hand-held device as recited in claim 3, further comprising a touch sensitive display and wherein the plurality of input receiving elements comprise a plurality of soft input elements caused to be displayed in the touch sensitive display.

6. The hand-held device as recited in claim 5, wherein, in the first operational mode, the hand-held device is configured to display a first set of the plurality of soft input elements in the touch sensitive display and, in the second operational mode, the hand-held device is configured to display a second set of the plurality of soft input elements in the touch sensitive display and wherein the first set of the plurality of soft input elements is different than the second set of the plurality of input elements.

7. The hand-held device as recited in claim 3, wherein the instructions cause the hand-held device to use input received into the hand-held device to select the first command code set and the second command code set from a library of command code sets stored in the memory.

8. The hand-held device as recited in claim 7, wherein the input used to select the first command code set and the second command code set is received via activations of one or more of the plurality of input receiving elements.

9. The hand-held device as recited in claim 3, wherein the first command code set and the second command code set are received into the hand-held device from a device located remotely from the hand-held device.

10. The hand-held device as recited in claim 1, wherein the instructions cause the hand-held device to use a distance between the hand-held device and the object surface as sensed by the sensor to determine when the hand-held device has been moved proximate to and away from the object surface.

11. The hand-held device as recited in claim 1, wherein the sensor comprises an optical sensing system.

* * * * *